(12) United States Patent
Hagimori et al.

(10) Patent No.: US 6,303,728 B1
(45) Date of Patent: Oct. 16, 2001

(54) HYDROSILYLATION PROCESS AND POLYMERS PRODUCED BY THE PROCESS

(75) Inventors: Shigeru Hagimori; Koji Tsuneishi, both of Kobe; Yoshimichi Yamanaka, Toyonaka; Syun Wachi, Takasago; Kazuya Yonezawa, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/462,467

(22) PCT Filed: Jul. 8, 1998

(86) PCT No.: PCT/JP98/03071

§ 371 Date: Mar. 3, 2000

§ 102(e) Date: Mar. 3, 2000

(87) PCT Pub. No.: WO99/02534

PCT Pub. Date: Jan. 21, 1999

(30) Foreign Application Priority Data

Jul. 8, 1997 (JP) .................................................. 9-181924

(51) Int. Cl.⁷ .................................................. C08G 77/08
(52) U.S. Cl. ................... 528/15; 528/23; 556/479
(58) Field of Search ................... 528/23, 25, 31, 528/15; 252/182.14, 182.3; 556/479

(56) References Cited

U.S. PATENT DOCUMENTS

| | | | |
|---|---|---|---|
| 4,927,949 | * | 5/1990 | Kabeta et al. . |
| 4,952,643 | * | 8/1990 | Hirose et al. . |
| 4,975,488 | * | 12/1990 | Furukawa et al. . |
| 5,808,127 | * | 9/1998 | Nakagwaw et al. . |
| 5,977,249 | * | 11/1999 | Kovar et al. . |
| 6,150,441 | * | 11/2000 | Chiba et al. . |

FOREIGN PATENT DOCUMENTS

WO9621633 * 7/1996 (WO).

* cited by examiner

Primary Examiner—Margaret G. Moore
Assistant Examiner—Marc S. Zimmer
(74) Attorney, Agent, or Firm—Connolly Bove Lodge & Hutz

(57) ABSTRACT

The present invention has its object to provide an effective method of accelerating a hydrosilylation reaction.

This invention is related to a hydrosilylation reaction method which comprises carrying out the hydrosilylation reaction between a silicon compound (A) represented by the following general formula (1) and an alkenyl group-containing compound (B) in the presence of a Group VIII metal-containing catalyst (C) and a sulfur compound (D);

$$R_a X_b H_c Si \qquad (1).$$

18 Claims, No Drawings

HYDROSILYLATION PROCESS AND POLYMERS PRODUCED BY THE PROCESS

TECHNICAL FIELD

The present invention relates to a hydrosilylation reaction between a silicon hydride compound and a compound having an alkenyl group (carbon-carbon unsaturated bond). More particularly, the invention relates to a method of accelerating the hydrosilylation reaction.

BACKGROUND ART

The reaction by which a silicon hydride compound having an Si-H group is added to an alkenyl group (C-C unsaturated bond) is commonly known as hydrosilylation.

The major problem known in the technical field utilizing this reaction is that, under respective reaction conditions, the rate of hydrosilylation reaction drops or the reaction stops in the course of reaction due to the decrease in the activity of the catalyst used during the reaction, for instance. The decrease in the reaction rate not only leads to a protracted reaction time but also results in an increase in the proportion of side reactions to lower the selectivity for the objective hydrosilylation reaction. The reaction may be accelerated by raising the addition amount of the expensive metal catalyst but the practice results in an increase in the amount of catalyst residues in the reaction product, which is sometimes objectionable for subsequent use of the product (taking the hydrosilylation of a high polymer as an example, the black particles derived from the catalyst can hardly be removed so that the product suffers from blackish opacification).

Various methods are known for accelerating a hydrosilylation reaction. For example, as described by Onopchenko, A. et al. [J. Org. Chem., 52, 4118, 1987 and Lewis, L. N. et al. [J. Am. Chem. Soc., 112, 5998, 1990 or in Japanese Kokai Publication Hei-5-213972 and Japanese Kokai Publication Hei-8-283339, the technology of using oxygen for reactivating a deactivated platinum catalyst is known. With regard to substances effective in accelerating the reaction, the technology using an acetylene alcohol (Japanese Kokai Publication Hei-8-231563), an unsaturated secondary/tertiary alcohol system (Japanese Kokai Publication Hei-8-291181), a tertiary alcohol (Japanese Kokai Publication Hei-8-333373), an unsaturated ketone (Japanese Kokai Publication Hei-8-208838) or an ene-yne unsaturated compound (Japanese Kokai Publication Hei-9-25281) is known.

Furthermore, in the system containing elemental N, P, S, Sn or As, which is known as the hydrosilylation catalyst poison, the use of an organoiron compound and/or an organoaluminum compound (Japanese Kokai Publication Hei-6-179821) is also known.

While the rate of hydrosilylation reaction is dependent on reactant species and reaction conditions, the reaction activity is liable to drop particularly in the case that the concentration of unsaturated groups is low, the case that the viscosity of the reaction mixture is high, the case that an internal olefin which is less active than a terminal olefin is involved in the reaction, or the case that the starting material or the solvent contains a reaction inhibitor substance.

Furthermore, there is the tendency that in a system experiencing a drop in reaction activity, a protracted reaction time causes to increase formation of byproducts. The hydrosilylation reaction introducing a hydrolyzable silyl group, such as methoxysilyl, into a polymer is important. A polymer containing a hydrolyzable silyl group is capable of forming a crosslinked compound of higher molecular weight through intermolecular silanol condensation reaction and such crosslinkable polymers are of great use. If the rate of a hydrosilylation reaction for introducing a hydrolyzable silyl group into a polymer drops, the density of crosslinking sites is decreased so that the strength of the crosslinked polymer is ultimately sacrificed.

The technology is k now n which comprises using an expensive noble metal catalyst or a silicon compound in an large amount to improve the reaction yield but it is not acceptable economically. The hitherto-known technology for accelerating a hydrosilylation reaction is, thus, not impeccable but is of ten incapable of solving the problem to a fully satisfactory extent.

DISCLOSURE OF INVENTION

In view of the above state of the art, the present invention has for its object providing an effective method of accelerating a hydrosilylation reaction.

Sulfur compounds are generally thought to impede the catalyst activity of metals and, in the field of hydrosilylation, too, it has been the common belief that sulfur compounds should be excluded as far as possible. Therefore, it was almost inconceivable from such common knowledge that a hydrosilylation reaction could ever be conducted in the presence of a sulfur compound which is a catalyst poison as well.

After intensive research, the inventors of the present invention found that a hydrosilylation reaction carried out in the presence of a sulfur compound results in an acceleration of the reaction and is, thus, of great industrial benefit. The inventors have accordingly developed the present invention.

The present invention, therefore, is directed to a hydrosilylation reaction method which comprises carrying out the hydrosilylation reaction between a silicon compound (A) of the following general formula (1) and an alkenyl group-containing compound (B) in the presence of a group VIII metal-containing catalyst (C) and a sulfur compound (D);

$$R_a X_b H_c Si \qquad (1)$$

(in the formula, R represents an alkyl group containing 1 to 20 carbon atoms, an aryl group containing 6 to 20 carbon atoms or a triorganosiloxy group; when a is not less than 2, the plurality o f R's may be the same or different; X represents a halogen atom, an alkoxyl group, an acyloxyl group or a hydroxyl group; when b is not less than 2, the plurality of X's may be the same or different; a and b each represents an integer of 0 to 3; c represents an integer of 1 to 3; provided, however, that a, b and c are such that a+b+c=4).

The present invention is further directed to a polymer which is prepared by the reaction method.

In the following, the present invention is described in detail.

The silicon compound (A) mentioned above is not particularly restricted but includes, among others, halosilanes such as trichlorosilane, methyldichlorosilane, dimethylchlorosilane, trimethylsiloxydichlorosilane, etc.; alkoxysilanes such as trimethoxysilane, triethoxysilane, dimethoxymethylsilane, methoxydimethylsilane, dimethoxyphenylsilane, 1,3,3,5,5,7,7-heptamethyl-1,1-dimethoxytetrasiloxane, etc.; acyloxysilanes such as methyldiacetoxysilane, trimethylsiloxymethylacetoxysilane, etc.; hydrosilanes containing two or more Si—H bonds per a molecule, such as dimethylsilane, trimethylsiloxymethylsilane, 1,1,3,3-tetramethyldisiloxane, 1,3,5-trimethylcyclotrisiloxane, etc.;

and alkenyloxysilanes such as methyldi(isopropenyloxy) silane and so on. Those compounds can be used each alone or in a combination of two or more species.

Among them, methyldichlorosilane, dimethoxymethylsilane, diethoxymethylsilane, trimethoxysilane and triethoxysilane are preferred.

The amount of use of said silicon compound (A) is not particularly restricted but is generally 0.1 to 20 mols per mol of the alkenyl group. The preferred range, from economic points of view, is 0.5 to 3 mols.

The above-mentioned alkenyl group (C-C unsaturated bond)-containing compound (B) is not particularly restricted but includes alpha-olefins such as ethylene, propylene, 1-butene, 1-hexene, etc.; cyclohexene; trans-2-hexene; butadiene, decadiene; allyltrimethylsilane; alkenyl group-containing polymers; among others. Those compounds can be used each alone or in a combination of two or more species.

The backbone chain of the alkenyl group-containing polymer mentioned above is not particularly restricted but includes among others, a hydrocarbon backbone chain, a halogenated hydrocarbon backbone chain, a saturated hydrocarbon backbone chain, a polyether backbone chain, a polyester backbone chain, a polyamide backbone chain and a polyimide backbone chain.

The preferred backbone chain of said alkenyl group-containing polymer, when the polymer has a silyl group, includes polymers of isobutylene, olefins having 5 to 12 carbon atoms, conjugated dienes, non-conjugated dienes, vinyl ethers, aromatic vinyl compounds, norbornenes, cyclopentadienes, dicyclopentadienes, vinylsilanes, etc.; polyethylene glycol, polypropylene glycol and polytetramethylene glycol, among others.

As the alkenyl group-containing polymers mentioned above, in particular, allyl-terminated polypropylene oxide or allyl-terminated polyisobutylene is preferred.

The allyl-terminated polyisobutylene mentioned above can be obtained by the reaction of a chlorine-terminated polyisobutylene with allyltrimethylsilane as disclosed in Japanese Kokai Publication Sho-63-105005 or with the diene compound as disclosed in Japanese Kokai Publication Hei-4-288309.

The alkenyl group-containing polymer mentioned above preferably has a number average molecular weight of 500 to 200000 as measured by GPC using a polystyrene gel column.

The Group VIII metal-containing catalyst (C) mentioned above is a catalyst containing any metal belonging to the Group VIII of Periodic Table of the Elements, such as cobalt, nickel, ruthenium, rhodium, palladium, iridium and platinum, and may be any of Group VIII metals as simple substances, metal salts and complexes with organic compounds. More particularly, there can be mentioned platinum as a simple substance; a platinum catalyst on a support, such as platinum immobilized on alumina, silica, carbon black or the like; platinumcompounds such as chloroplatinic acid and its compounds, such as the complex formed between chloroplatinic acid and an alcohol, aldehyde or ketone; platinum-olefin complexes such as $Pt(CH_2=CH_2)_2(PPh_3)$, $Pt(CH_2=CH_2)_2Cl_2$, etc.; platinum-vinylsiloxane complexes such as $Pt\{(vinyl)Me_2SiOSiMe_2(vinyl)\}$, $Pt\{Me(vinyl)SiO\}_4$, etc.; platinum-phosphine complexes such as $Ph(PPh_3)_4$, $Pt(Pbu_3)_4$, etc.; platinum-phosphite complexes such as $Pt\{P(OPh)_3\}_4$ etc.; dicarbonyldichloroplatinum, the platinum-hydrocarbon complexes disclosed in U.S. Pat. No. 3,159,601 and U.S. Pat. No. 3,159,662 issued to Ashby; the platinum-alcoholate catalyst disclosed in U.S. Pat. No. 3,220,972 issued to Lamoreaux; and the platinum chloride-olefin complex disclosed in U.S. Pat. No. 3,516,946 issued to Modic, among others. Those catalyst species can be used each independently or in a combination of two or more species.

Among the above-mentioned catalysts, the preferred catalysts in view of their comparatively high reaction activity are elemental platinum, chloroplatinic acid, said complex of chloroplatinic acid with an alcohol, aldehyde or ketone, said platinum-olefin complex, said platinum-acetylacetonate complex, said platinum-vinylsiloxane complex, said platinum-phosphine complex, said platinum-phosphite complex, and any of them as immobilized on a solid support such as alumina, silica or carbon black.

In the present invention, the above catalyst is preferably dissolved and diluted in a suitable solvent to stabilize it and facilitate its handling.

The solvent mentioned above is not particularly restricted but includes hydrocarbon series solvents such as benzene, toluene and xylene; halogenated hydrocarbon series solvents; alcohols; glycols; ethers; and esters, among others. Those solvents may be used each independently or in a combination of two or more species.

The addition amount of said catalyst is not particularly restricted but the platinum catalyst, for instance, is generally used within the range of $10^{-1}$ mol to $10^{-8}$ mol, preferably $10^{-3}$ mol to $10^{-6}$ mol, per mol of the alkenyl group. If the amount is less than $10^{-8}$ mol, the hydrosilylation reaction may not proceed adequately, while the use of the catalyst in excess of $10^{-1}$ mol has problems, for not only the material cost is increased but the discoloration and the decrease in clarity of the product due to contamination with catalyst residues will be encountered.

The sulfur compound (D) mentioned above is not particularly restricted as far as it contains a sulfur atom within the molecule, thus including elemental sulfur, thiols, sulfides, sulfoxides, sulfones and thioketones, among others. Those compounds can be used each independently or in a combination of two or more species. The preferred, among them, is elemental sulfur.

When the sulfur compound is to be added to a liquid-phase reaction system, the sulfur compound as such can be directly added. However, the sulfur compound, such as elemental sulfur, can be more uniformly dispersed into the reaction mixture by dissolving it in an organic solvent such as toluene, hexane or xylene beforehand.

The addition amount of said sulfur compound (D) may for example be 0.1 to 10 times as large as the molar quantity of the Group VIII metal-containing catalysts, 0.002 to 0.1 times as large as the molar quantity of the alkenyl groups of said alkenyl-containing compounds (B), or 0.01 to 500 ppm based on the total weight of the reaction mixture. If the addition amount is too low, the effect of the present invention may not necessarily be fully attained. If, conversely, the addition amount is too high, the sulfur compound will act as a catalyst poison to depress the catalyst activity and thereby interfere with the hydrosilylation reaction.

The hydrosilylation reaction can be carried out in the absence of a solvent or in a solvent.

The solvent mentioned just above is not particularly restricted but includes hydrocarbons, halogenated hydrocarbons, aromatic hydrocarbons, ethers and esters, among others. Those solvents may be used each independently or in a combination of two or more species. Preferred solvents, among them, are heptane, hexane, benzene, toluene or xylene.

In the hydrosilylation of an alkenyl-containing polymer, the polymer used is either a solid or a highly viscous liquid in many instances. Therefore, a solvent is preferably used to reduce the viscosity of the reaction system.

As the solvent for use in the hydrosilylation of a polymer according to the present invention, a plasticizer may likewise be employed. The plasticizer mentioned just above is a liquid substance which is added to polymer products.

When the number average molecular weight of the alkenyl group-containing polymer is 500 to 200000, a paraffinic plasticizer (E) having a molecular weight of 200 to 800 is preferably used as the reaction solvent.

The plasticizer as such is not particularly restricted but includes, among others, a mixture of 50 to 90% of paraffin, 10 to 50% of naphthene, and about 1% of aromatics; hydrocarbon compounds such as polybutene, hydrogenated polybutene, methylstyrene oligomer, biphenyl, triphenyl, triaryldimethanes, alkylene-triphenyls, liquid polybutadiene, hydrogenated liquid polybutadiene, alkyldiphenyls, etc.; adipic ester compounds such as Daihatchi Chemical Industry's BAA-5 (trade mark), Dainippon Ink and Chemical's P103 and W320 (trade marks), Adeka Argus Chemical's PN-150 (trade mark), etc.; trimellitic ester compounds such as Shin Nippon Rika's TOTM and TITM (trade marks), Dainippon Ink and Chemical's W-700 (trade mark), etc.; petroleum series process oils such as IdemitsuPetrochemical's NS-100, NM-26, NP-24, PS-32, PW-32 and PX-32 (trade marks), etc.; Nippon Petroleum Detergent's Alkene-68 (trade mark), Adeka Argus Chemical's BF-1000 (trade mark), Arakawa Chemical Industry's KE-828 (trade mark) and Shin-Nippon Rikagaku's DOTP (trade mark), among others. Those plasticizers can be used each independently or in a combination of two or more species. Among those plasticizers, Alkene-68, PS-32, PW-32, PX-32, DOTP, NS-100 and TOTM (trade marks) are preferred in view of small weight losses on heating.

In the present invention, exclusively an inert gas, such as nitrogen or helium may be present, or optionally oxygen or the like may be present, in the gaseous phase within the reactor used for said hydrosilation reaction.

In view of the safety of handling inflammable materials, there are cases in which a hydrosilylation reaction is conducted under conditions such that the gaseous phase within the reactor is exclusively comprised of an inert gas such as nitrogen or helium. In such cases, however, the reaction velocity is sometimes sacrificed. There are cases in which the presence of oxygen (F) is promotive of a hydrosilylation reaction. Therefore, the hydrosilylation reaction may be carried out by introducing oxygen (F) into the gas phase within the reactor and controlling the oxygen concentration of the gas phase within the reactor within the range not forming an explosive mixture, whereby the hydrosilylation reaction can be accelerated and carried through safely. The oxygen concentration of the gas phase within the reactor is usually not less than 0.1% and preferably 0.5 to 10%.

When oxygen (F) is introduced into the gas phase within the reactor, the hydrosilylation reaction is preferably conducted in the presence of an antioxidant (G) in order that the oxidation of the solvent and/or plasticizer, etc. in the reactor by oxygen may be inhibited.

The antioxidant (G) mentioned above is not particularly restricted but includes, among others, phenolic antioxidants having the inhibitory function of the chain radical reaction such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis{methylene-3(3,5-di-tert-butyl-4-hydroxyphenyl)propionate}methane, 1,1,3-tris(2-methyl-4-hydroxy-5-tert-butylphenyl)butane, etc.; amine series antioxidants having the inhibitory function of the chain radical reaction, such as phenyl-$\beta$-naphthylamine, $\alpha$-naphthylamine, N,N'-di-sec-butyl-p-phenylenediamine, phenothiazine, N,N'-diphenyl-p-phenylenediamine, etc. Those antioxidants can be used each independently or in a combination of two or more species.

The reaction temperature for said hydrosilylation is 30° C. to 200° C. The preferred range is 50° C. to 120° C.

In accordance with the present invention, a variety of organosilicon compounds can be produced efficiently.

In the present invention, a hydrolyzable silyl group (Si—X)-terminated polymer, for instance, can be obtained as the result of the hydrosilylation reaction between said alkenyl group-containing polymer (A) and said silicon compound (B) represented by the general formula (1).

The hydrolyzable silyl group (Si—X) mentioned above is a group which is hydrolyzed to give a silanol group (Si-OH).

The condensation reaction (silanol condensation) between said hydrolyzable silyl group (Si—X) and said silanol group (Si—OH) gives a crosslinked compound containing a siloxane (Si—O—Si) bond.

For example, the hydrosilylation reaction between methyldimethoxysilane and an alkenyl group-terminated polymer gives a polymer having a dimethoxysilyl group, which is a species of said hydrolyzable silyl group, as a terminal group.

The hydrolyzable silyl-terminated polymer undergoes hydrolysis of its silyl group in the presence of moisture from the air, for instance, and further undergoes silanol condensation with another polymer molecule to give a crosslinked polymer (Japanese Kokai Publication Sho-63-6041).

Polymers having said hydrolyzable silyl group or said silanol group have good weathering resistance, heat resistance and moisture-barrier properties so that they find application in various applications such as adhesives, pressure-sensitive adhesives, coatings, sealants, and water-proofing materials.

BEST MODE FOR CARRYING OUT THE INVENTION

The following examples are intended to illustrate the present invention in further detail and should by no means be construed as defining the scope of the invention.

EXAMPLE 1

Forty kilograms of the allyl-terminated polyisobutylene (mol. wt. 15000, the number of allyl groups per mol of the polymer is 2.0) prepared by the process described in Japanese Kokai Publication Sho-63-105005 was reacted with 1.4 kg of dimethoxymethylsilane. As the reaction solvent, 20 kg of Idemitsu Petrochemical's Process Oil PS-32 (trade mark) was used. As the catalyst, 2.8 g of platinum-vinylsiloxane complex (0.00000831 mmol/$\mu$L in xylene) was added. Into the gas phase within the reactor, nitrogen-5 vol % oxygen was introduced up to a pressure of 5 atm. As an antioxidant, 12 g of 2,6-di-tert-butyl-p-cresol was added. Elemental sulfur (0.04 g) was dissolved in 40 g of toluene and fed into the reactor.

After addition of dimethoxysilane and the reaction was initiated, the reaction system was continuously stirred at 70° C. for 15 hours to carry out hydrosilylation to provide a silyl group-terminated polymer.

For the evaluation of the conversion rate of allyl groups, the hydrosilylation reaction mixture was sampled and the concentration of allyl functional groups was measured on an infrared spectrophotometer. As a result, no residual allyl group was detected and the conversion rate, thus, was 100%.

Using the same sample, the rate of introduction of dimethoxymethylsilane was determined by $^1$H-NMR spectrometry. It was found that 1.6 silyl groups had been introduced into each molecule of the polymer.

One-hundred parts by weight of a mixture of the resulting silyl group-terminated polymer and the plasticizer PS-32 (trade mark) was mixed with 0.67 part by weight of water and 2.5 parts by weight of stannous octanoate and the condensation-crosslinking reaction was carried out at 50° C. for 20 hours to prepare a testpiece of rubbery cured product (JIS No. 3 dumbbell: 5 mm wide×2 mm thick). This rubber-like cured product was subjected to a tensile test to measure a tensile stress at 50% elongation and the modulus of the cured product was evaluated. The result is shown below in the table.

EXAMPLE 2

Except that the hydrosilylation reaction was carried out using 0.2 g of sulfur, the procedure of Example 1 was otherwise followed to provide a silyl group-terminated polymer.

The reaction mixture was sampled and the residual allyl functional group concentration was measured as in Example 1. The reaction conversion rate was 100%. Using this sample, the dimethoxymethylsilane introduction rate was determined by $^1$H-NMR analysis. As a result, 1.5 silyl groups had been introduced per a molecule of the polymer.

Using the above silyl group-terminated polymer, a cured sample was prepared and its modulus was evaluated as in Example 1. The result is shown below in the table.

EXAMPLE 3

Except that the hydrosilylation reaction was carried out using 0.004 g of sulfur, the procedure of Example 1 was otherwise followed to provide a silyl group-terminated polymer.

The reaction mixture was sampled and the residual allyl functional group concentration was measured as in Example 1. The reaction conversion rate was 95%. Using this sample, the dimethoxymethylsilane introduction rate was determined by $^1$H-NMR analysis. As a result, 1.4 silyl groups had been introduced per a molecule of the polymer.

Using the above silyl group-terminated polymer, a cured sample was prepared and its modulus was evaluated as in Example 1. The result is shown below in the table.

COMPARATIVE EXAMPLE 1

Except that the hydrosilylation reaction was carried out without addition of a sulfur compound, the procedure of Example 1 was otherwise repeated to provide a silyl group-terminated polymer.

The reaction mixture was sampled and the residual allyl functional group concentration was measured as in Example 1. The reaction conversion rate was 70%. Using this sample, the dimethoxymethylsilane introduction rate was determined by $^1$H-NMR analysis. As a result, 0.7 silyl group had been introduced per a molecule of the polymer.

The hydrosilylation reaction was further continued and the reaction mixture at 30-hour after the start of reaction was sampled. The residual allyl functional group concentration of the sample was determined. As a result, the reaction conversion rate was 95%. Using this sample, the dimethoxymethylsilane introduction rate was determined. As a result, 0.8 silyl group had been introduced per a molecule of the polymer.

Using this silyl group-terminated polymer, a cured sample was prepared and its modulus was evaluated as in Example 1. The result is shown below in the table.

COMPARATIVE EXAMPLE 2

Except that the hydrosilylation reaction was carried out using 0.04 kg of toluene instead of adding a reaction accelerator, the procedure of Example 1 was otherwise followed to provide a silyl group-terminated polymer.

The reaction mixture was sampled and the residual allyl functional group concentration was measured as in Example 1. The reaction conversion rate was 75%. Using this sample, the dimethoxymethylsilane introduction rate was determined by H-NMR analysis. As a result, 0.8 silyl group had been introduced per a molecule of the polymer.

The hydrosilylation reaction was further continued and the reaction mixture at 30-hour after the start of reaction was sampled. The residual allyl functional group concentration of the sample was determined. As a result, the reaction conversion rate was 100%. Using this sample, the dimethoxymethylsilane introduction rate was determined. As a result, 1.1 silyl groups had been introduced per a molecule of the polymer.

Using the above-mentioned silyl-terminated polymer, a cured sample was prepared and its modulus was evaluated as in Example 1. The result is shown below in the table.

COMPARATIVE EXAMPLE 3

The procedure of Example 1 was repeated except that the addition of a sulfur compound was omitted and a solution of 5.6 g of the catalyst platinum-vinylsiloxane complex in xylene was added, whereby a silyl group-terminated polymer was obtained.

The reaction mixture was sampled and the residual allyl functional group concentration was measured as in Example 1. The reaction conversion rate was 90%. Using this sample, the dimethoxymethylsilane introduction rate was determined by $^1$H-NMR analysis. As a result, 0.9 silyl group had been introduced per a molecule of the polymer.

Using the above-mentioned silyl group-terminated polymer, a cured sample was prepared and its modulus was evaluated as in Example 1. The result is shown below in the table.

COMPARATIVE EXAMPLE 4

Except that the hydroxylation reaction was carried out using 40 g of sulfur, the procedure of Example 1 was otherwise followed to provide a silyl group-terminated polymer.

The reaction mixture was sampled and the residual allyl functional group concentration was measured as in Example 1. The reaction conversion rate was 25%. Using this sample, the dimethoxymethylsilane introduction rate was determined by $^1$H-NMR analysis. As a result, 0.4 silyl group had been introduced per a molecule of the polymer.

Using the above-mentioned silyl group-terminated polymer, a cured sample was prepared and its modulus was evaluated as in Example 1. The result is shown below in the table.

|  |  | Example 1 | Example 2 | Example 3 | Comp. Ex. 1 | Comp. Ex. 2 | Comp. Ex. 3 | Comp. Ex. 4 |
| --- | --- | --- | --- | --- | --- | --- | --- | --- |
| Sulfur added (g) |  | 0.04 | 0.2 | 0.004 | 0 | 0 | 0 | 40 |
| Catalyst added (g) |  | 2.8 | 2.8 | 2.8 | 2.8 | 2.8 | 5.6 | 2.8 |
| After 15 hrs of reaction | Reaction rate (%) | 100 | 100 | 95 | 70 | 75 | 90 | 25 |
|  | No. of silyl groups introduced | 1.6 | 1.5 | 1.4 | 0.7 | 0.8 | 0.9 | 0.4 |
| After 30 hrs of reaction | Reaction rate (%) | — | — | — | 95 | 100 | — | — |
|  | No. of silyl groups introduced | — | — | — | 0.8 | 1.1 | — | — |
| Modulus at 50% elongation (kg/cm$^2$) |  | 1.4 | 1.3 | 1.2 | 0.7 | 0.8 | 0.9 | 0.3 |

Whereas the conversion rates of hydrosilylation reaction were 100%, 100% and 95% in Examples 1, 2 and 3, respectively, the conversion rates were as low as 70%, 75%, 90% and 25% in Comparative Examples 1, 2, 3 and 4, respectively. In Comparative Examples 1 and 2, the reaction was further continued to 30 hours and, as a result, the conversion rate reached 95% and 100%, respectively. The reaction-accelerating effect of the hydrosilylating method of the present invention could be thus confirmed.

Whereas the numbers of silyl functional groups introduced at the completion of reaction were as large as 1.6, 1.5 and 1.4 in Examples 1, 2 and 3, respectively, the numbers were as small as 0.7, 0.8, 0.9 and 0.4 in Comparative Examples 1, 2, 3 and 4, respectively. As a result, whereas the modulus values of rubbery cured products in Examples 1, 2 and 3 were as high as 1.4, 1.3 and 1.2 kg/cm$^2$, respectively, the modulus values in Comparative Examples 1, 2, 3 and 4 were as low as 0.7, 0.8, 0.9 and 0.3 kg/cm$^2$, respectively.

INDUSTRIAL APPLICABILITY

By hydrosilylating an alkenyl group-containing compound in accordance with the method of the present invention, the reaction could be sufficiently accelerated even in a system not sufficiently accelerated by the conventional reaction accelerating techniques and the reaction product could be obtained with high reproducibility. By using the method of the present invention, the catalyst consumption can be minimized to reduce the cost of production and the product purity be improved because of a reduction in the amount of catalyst residues in the product.

Furthermore, in the production of a crosslinkable silyl group-containing polymer of high molecular weight by hydrosilylating an alkenyl group-containing polymer of high molecular weight, the accelerated reaction resulted in an increase in the rate of introduction of silyl groups so that a cured product expressing very satisfactory physical properties could be obtained.

What is claimed is:

1. A hydrosilylation reaction method which comprises carrying out the hydrosilylation reaction between a silicon compound (A) represented by the following general formula (1) and an alkenyl group-containing compound (B) in the presence of a Group VIII metal-containing catalyst (C) and elemental sulfur;

$$R_aX_bH_cSi \qquad (1)$$

(in the formula, R represents an alkyl group containing 1 to 20 carbon atoms, an aryl group containing 6 to 20 carbon atoms or a triorganosiloxy group; when a is not less than 2, the plurality of R's may be the same or different; X represents a halogen atom, an alkoxyl group, an acyloxyl group or a hydroxyl group; when b is not less than 2, the plurality of Xs may be the same or different; a and b each represents an integer of 0 to 3; c represents an integer of 1 to 3; provided, however, that a, b and c are such that a+b+c=4).

2. The reaction method according to claim 1, wherein the silicon compound (A) represented by the general formula (1) is at least one compound selected from the class consisting of methyldichlorosilane, dimethoxymethylsilane, diethoxymethylsilane, trimethoxysilane and triethoxysilane.

3. The reaction method according to claim 1, wherein the alkenyl group-containing compound (B) is a polymer having a number average molecular weight of 500 to 200000.

4. The reaction method according to claim 1, wherein the Group VIII metal-containing catalyst (C) is at least one member selected from the class consisting of elemental platinum, chloroplatinic acid, a chloroplastinic acid-alcohol, aldehyde or ketone complex, a platinum-olefin complex, a platinum-vinylsiloxane complex, a platinum-phosphine complex, a platinum-phosphite complex, and those as immobilized on a solid support comprising alumina, silica or carbon black.

5. The reaction method according to claim 1, wherein the addition amount of elemental sulfur is 0.1 to 10 times as large as the molar quantity of said Group VIII metal-containing catalysts (C).

6. The reaction method according to claim 1, or wherein the addition amount of elemental sulfur is 0.002 to 0.1 times as large as the molar quantity of the alkenyl groups of said alkenyl group-containing compounds (B).

7. The reaction method according to claim 1, wherein the addition amount of elemental sulfur is 0.01 to 500 ppm based on the total weight of the reaction mixture.

8. The reaction method according to claim 1, which comprises currying out the reaction with further addition of a paraffinic plasticizer (E) having an average molecular weight of 200 to 800.

9. The reaction method according to claim 1, 2, 3, 4, 5, 6, 7 or 8, wherein the hydrosilylation reaction is conducted with the gas phase within a reactor containing not less than 0.1% of oxygen (F) and with further addition of an antioxidant (G).

10. The reaction method according to claim 1,
wherein said alkenyl group-containing compound (B) is an alkenyl group-containing polymer having a saturated hydrocarbon backbone chain as its backbone chain.

11. The reaction method according to claim 10, wherein the alkenyl group-containing compound (B) is allyl-terminated polyisobutylene.

12. The reaction method according to claim 2, wherein the alkenyl group-containing compound (B) is a polymer having a number average molecular weight of 500 to 200000.

13. The reaction method according to claim 2, wherein the Group VIII metal-containing catalyst (C) is at least one member selected from the class consisting of elemental platinum, chloroplatinic acid, a chloroplastinic acid-alcohol, aldehyde or ketone complex, a platinum-olefin complex, a platinum-vinylsiloxanc complex, a platinum-phosphlilne complex, a platinum-phosphatic complex, and those as immobilized on a solid support comprising alumina, silica or carbon black.

14. The reaction method according to claim 3, wherein the Group VIII metal-containing catalyst (C) is at least one member selected from the class consisting of elemental platinum, chloroplatinic acid, a chloroplastiic acid-alcohol, aldehyde or ketone complex, a platinum-olefin complex, a platinum-viniylsiloxanic complex, a platinum-phosphinie complex, a platinum-phosphite complex, and those as immobilized on a solid support comprising alumina, silica or carbon black.

15. The reaction method according to claim 2, wherein the addition amount of elemental sulfur is 0.1 to 10 times as large as the molar quantity of said Group VIII metal-containing catalysts (C).

16. The reaction method according to claim 3, wherein the addition amount of elemental sulfur is 0.1 to 10 times as large as the molar quantity of said Group VIII metal-containing catalysts (C).

17. The reaction method according to claim 4, wherein the addition amount of elemental sulfur is 0.1 to 10 times as large as the molar quantity of said Group VIII metal-containing catalysts (C).

18. The reaction method according to claim 2, wherein the addition amount of elemental sulfur is 0.002 to 0.1 times as large as the molar quantity of the alkenyl groups of said alkenoyl group-containing, compounds (B).

* * * * *